United States Patent
Queveau et al.

(10) Patent No.: US 7,152,905 B2
(45) Date of Patent: Dec. 26, 2006

(54) FOLDING RIGID ROOF

(75) Inventors: Paul Queveau, Montravers (FR); Gerard Queveau, Le Pin (FR); Jean-Marc Guillez, Cirieres (FR)

(73) Assignee: Heuliez (FR)

( * ) Notice: Subject to any disclaimer, the term of this patent is extended or adjusted under 35 U.S.C. 154(b) by 45 days.

(21) Appl. No.: 10/985,274

(22) Filed: Nov. 10, 2004

(65) Prior Publication Data

US 2006/0012214 A1    Jan. 19, 2006

(30) Foreign Application Priority Data

Jul. 2, 2004    (FR) ................... 04 07416

(51) Int. Cl.
*B60J 7/14* (2006.01)

(52) U.S. Cl. .................. 296/108; 296/107.17

(58) Field of Classification Search .......... 296/107.17, 296/108, 116, 117
See application file for complete search history.

(56) References Cited

U.S. PATENT DOCUMENTS

| | | | |
|---|---|---|---|
| 3,575,464 A | 4/1971 | Himka et al. | |
| 6,505,881 B1 * | 1/2003 | Kinnanen | 296/108 |
| 2004/0051342 A1 * | 3/2004 | Guillez et al. | 296/108 |
| 2005/0121938 A1 * | 6/2005 | Guillez et al. | 296/108 |
| 2005/0280281 A1 * | 12/2005 | Russke | 296/108 |

FOREIGN PATENT DOCUMENTS

FR    2 839 021    10/2003

\* cited by examiner

*Primary Examiner*—Lori L. Coletta
(74) *Attorney, Agent, or Firm*—Bachman & LaPointe

(57) ABSTRACT

The roof according to the present invention has a front part, a rear central element articulated to the front part of the roof, and two rear side elements that are installed free to move with respect to the central element. A front drive and guidance system is adapted to displace the side elements with respect to the central element when the front part of the roof is displaced with respect to the central element and includes two side connecting rods, each rod being installed free to rotate at the front part of the roof and relative to a displacement system designed to displace the corresponding side element relative to the central element.

8 Claims, 4 Drawing Sheets

FOLDING RIGID ROOF

BACKGROUND OF THE INVENTION

(1) Field of the Invention

The present invention relates to a folding rigid roof for an automobile vehicle.

(2) Prior Art

A mobile folding rigid roof free to move between an extended position in which it covers the vehicle passenger compartment and a folded position in which it is stored in the boot of the vehicle is known, the roof comprising a front part, a rear central element articulated to the front part of the roof and to the structural frame of the vehicle, and two rear side elements that together define a housing adapted to contain the rear central element and that are installed free to move with respect to the rear central element between a use position in which the rear central element is in the housing, the roof being in its extended position, and a stored position in which the rear central element is located above the housing and below the front part of the roof, the roof being in its folded position, the roof comprising front drive and guidance means adapted to displacing the rear side elements with respect to the rear central element when the front part of the roof is displaced with respect to the rear central element.

This type of roof, for example described in patent application FR 2 805 218, has the advantage that it leaves a good height in the boot when the roof is folded. The rear central element that is relatively thin over its entire surface, is separated from the rear side elements. Each rear side element has a relatively large dimension in the longitudinal direction of the vehicle when the roof is in its extended position, and this dimension is approximately vertical when the roof is in its folded position. Due to the separation from the rear side elements, the rear central element is offset upwards from the rear side elements due to the front drive and guidance means, so that the useful height of the boot under the rear central element when the roof is folded can be increased.

SUMMARY OF THE INVENTION

The present invention is intended to propose an alternative roof system that operates more reliably than known systems, to facilitate integration in a vehicle and reduce its cost.

According to the invention, the front drive and guidance means are formed from two side connecting rods, each rod being installed in rotation firstly at the front part of the roof and secondly at a displacement means designed to displace the corresponding rear side element relative to the rear central element.

Consequently, the front drive and guidance means form an integral part of the roof and there is no contact point with elements outside the roof (for example such as the structural frame of the vehicle), which simplifies assembly of the roof on the structural frame. Furthermore, the front drive and guidance mean elements are particularly simple.

BRIEF DESCRIPTION OF THE DRAWINGS

Other specific features and advantages will become clearer after reading the description of the embodiment given as a non-limitative example and illustrated by the appended figures.

DETAILED DESCRIPTION OF THE PREFERRED EMBODIMENT(S)

Figure 1:
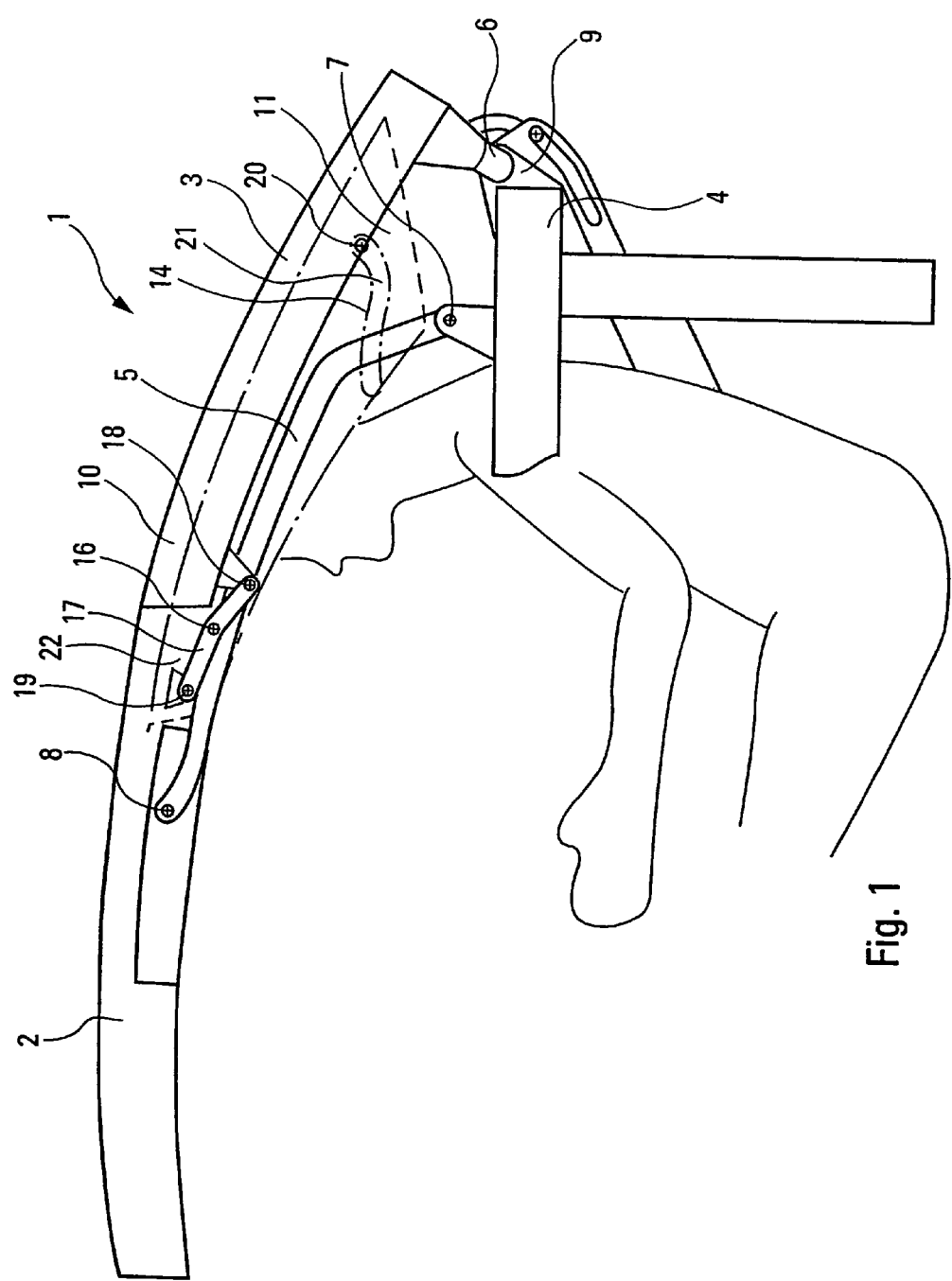
FIG. 1 shows a sectional view of the roof according to the present invention, the roof being in its extended position covering the vehicle passenger compartment.
Figure 2:
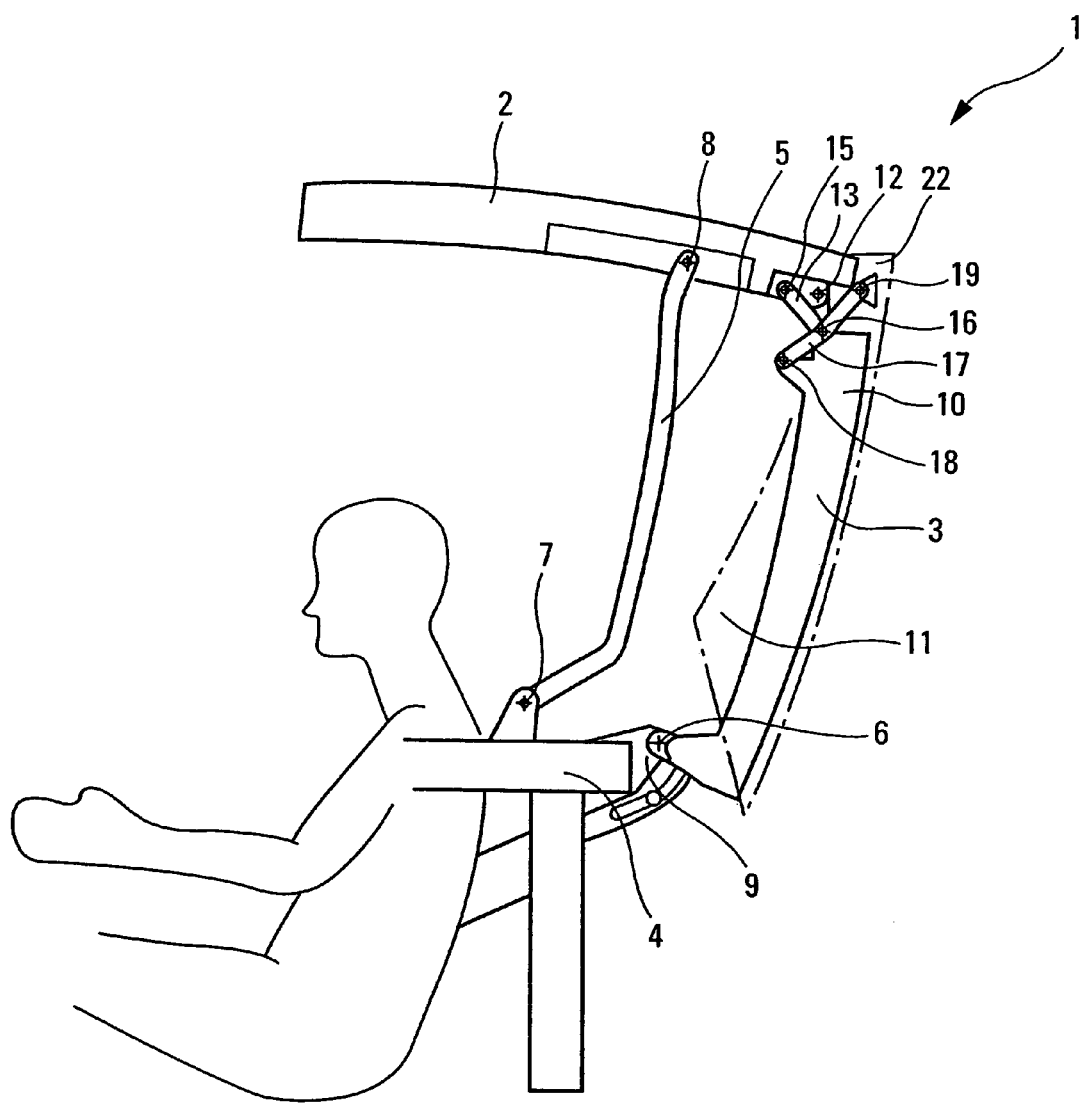
FIG. 2 is a sectional view of the roof according to the present invention, while the roof is being stored.
Figure 3:
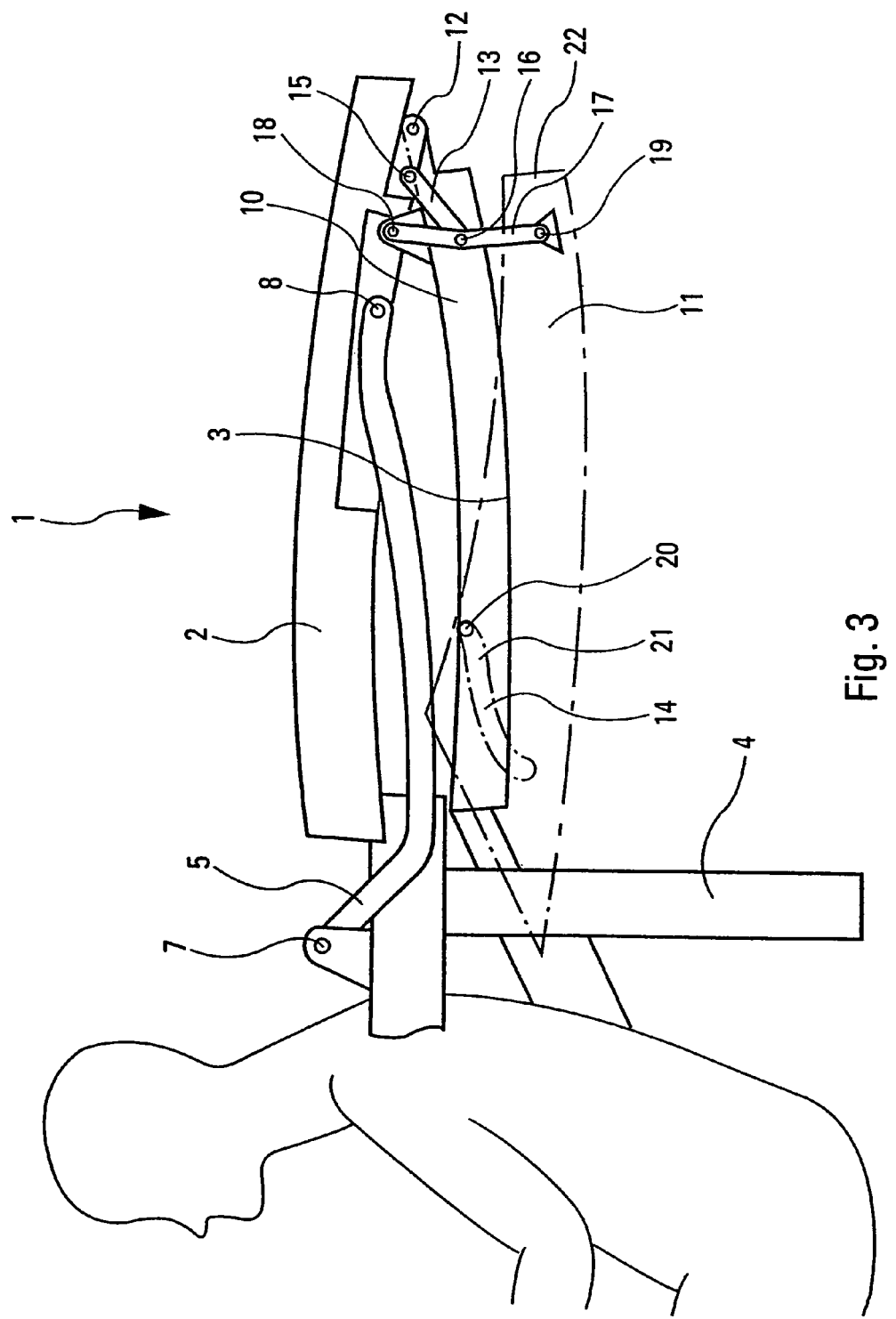
FIG. 3 is a sectional view of the roof according to the present invention, the roof being in its folded position stored in the boot of the vehicle.

As can be seen in FIGS. 1 to 3, the folding rigid roof 1 of a vehicle comprises a front part 2 and a rear part 3. The rear part 3 of the roof is articulated at its front end to the front part of the roof 2, and at its rear end to the structural frame 4 of the vehicle. In a known manner, displacement devices 5, 6 are adapted to moving the roof 1 between an extended position in which it covers the vehicle passenger compartment, and a folded position in which it is stored in the vehicle boot, the front part 2 of the roof being above the rear part 3 of the roof.

As can be seen in FIG. 2, the displacement devices 5, 6 include two side arms 5, each arm 5 being installed free to pivot firstly with respect to the structural frame 4 about a first rotation axis 7 extending along the transverse direction of the vehicle, and secondly to the front part 2 of the roof (and more precisely close to the rear edge of the front part 2 of the roof) about a second rotation axis 8 extending along the transverse direction of the vehicle.

As can be seen in FIGS. 1 and 2, the displacement devices 5, 6 also comprise a drive shaft 6 that extends along the transverse direction of the vehicle. The drive shaft is fixed to the rear part 3 of the roof (and more precisely close to the rear edge of the rear part 3 of the roof) and is installed free to rotate in the bearings 9 supported by the structural frame 4, forming the articulation between the structural frame 4 and the rear part 3 of the roof.

The rear part 3 of the roof comprises a central element 10 and two side elements 11 that together define a housing into which the central element 10 can fit.

Figure 4:
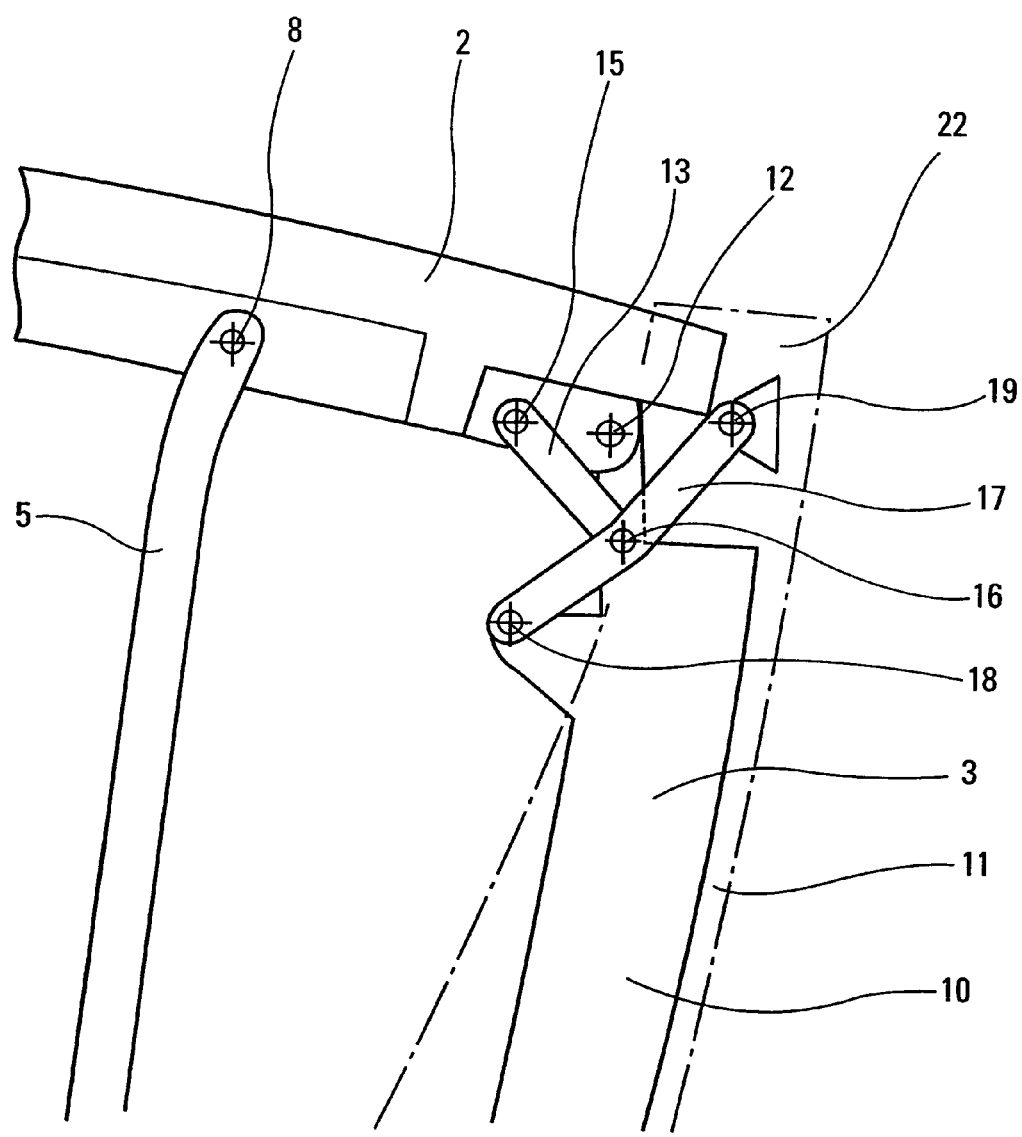
FIG. 4 shows an enlarged view of the part of FIG. 2 illustrating the connection between the front part of the roof and the rear part.

As can be seen in FIG. 4, the central element 10 (through its front edge) is mounted free to rotate with respect to the front part 2 of the roof about a connecting axis 12 extending along the direction transverse to the vehicle, the connecting axis 12 being located behind the second rotation axis 8. The side elements 11 have no direct contact with the front part 2 of the roof. Moreover, the drive shaft 6 is fixed to the central element 10 (and more precisely to its rear edge), the side elements not having any direct contact with the structural frame 4.

The side elements 11 are installed free to move relative to the central element 10 between a use position in which the central element 10 is in the housing, the roof 1 being in its extended position, and a stored position in which the entire central element 10 is above the housing, the roof being in its folded position. The roof 1 comprises front drive and guidance means 13 and rear drive and guidance means 14 adapted to enable the displacement of side elements 11 with respect to the central element 10 when the front part 2 of the roof is moved with respect to the central element 10. These front drive and guidance means 13 and rear drive and guidance means 14 form an integral part of the roof 1; they are not in contact with the structural frame 4, or with the displacement devices 6, 7.

The front drive and guidance means 13 are connected firstly to the front part 2 of the roof (and more precisely to the back edge of the front part 2 of the roof), and secondly to the rear part 3 of the roof (and more precisely to the front edge of the rear part 3 of the roof).

As can be seen in FIG. 4, the front drive and guidance means 13 are formed by two connecting rods 13 arranged on each side of the roof 1. Each connecting rod 13 is installed free to rotate, firstly with respect to the front part 2 of the roof about a first pivot axis 15 that extends along a transverse direction of the vehicle, and secondly about a second pivot axis 16 that extends along the direction transverse to the vehicle, with respect to a displacement means 17 that is designed to displace the corresponding side element 11 relative to the central element 10.

In this embodiment, the first pivot axis 15 is placed behind the second rotation axis 8, and in front of the connecting axis 12.

Furthermore, in this embodiment, each displacement means 17 is formed from a linkage element 17 that is mounted free to rotate firstly relative to the central element 10 (and more precisely relative to the front edge of the central element 10) about a third pivot axis 18 that extends along the transverse direction of the vehicle, and secondly to the corresponding side element 11 (and more precisely relative to the side edge of the side element 11) about a fourth pivot axis 19 that extends along the transverse direction of the vehicle.

In this embodiment, for each linkage element 17, the second pivot axis 16 through which the linkage element 17 is connected to the corresponding connecting rod 13, is located between the third and fourth pivot axes 18, 19 through which the linkage element 17 is connected to the central element 10 and the corresponding side element 11.

The rear drive and guidance means 14 are integrated into the rear part 3 of the roof (and more precisely into the rear edge of the rear part 3 of the roof). The rear drive and guidance means 14 are connected firstly to the central element 10 (and more precisely in the rear edge of the central element 10), and secondly to the side elements 11 (and more precisely in the rear edge of the side elements 11).

As can be seen in FIGS. 1 and 3, the rear drive and guidance means 14 are formed by two side slide systems 14. In this embodiment, each slide system 14 is formed of a stud 20 that is fixed to the central element 10 and that is installed free to slide along a slide 21 fixed to the corresponding side element 11.

Each slide 21 is made in the bottom part of the corresponding side element 11 and extends approximately along the longitudinal direction of the vehicle, the roof 1 being in its extended position. Each slide 21 also extends slightly along the vertical direction when the roof 1 is in its extended position, so as to have a shape according to which, when the roof 1 is in its extended position, its median part extends approximately horizontally, its front end is curved downwards and its rear end is curved upwards.

During operation, when the displacement devices 5, 6 are active, they cause displacement of the front part 2 of the roof and the central element 10, the centerline of the drive shaft 6, the first and second rotation axes 7, 8 and the connecting axis 12 forming a first deformable parallelogram 6, 7, 8, 12. Displacement of the central element 10 with respect to the front part 2 of the roof causes displacement of the rods 13 and of the connecting rods 16, the connecting axis 12, the first, second and third pivot axes 15, 16, 18 forming a second deformable parallelogram 12, 15, 16, 18. Displacement of the connecting rods 16 causes displacement of the side elements 11 since they are connected through the fourth pivot axis 19 and slide systems 14.

When the roof 1 starts to open, the configuration of the second parallelogram 12, 15, 16, 18 pushes the side elements 11 in a direction approximately perpendicular to the surface of the central element 10. Consequently, the main effect on the seals arranged between the central element 10 and the side elements 11 is to compress them, since friction in the longitudinal direction is very much reduced. Therefore this configuration of the second parallelogram 12, 15, 16, 18 reduces wear in these seals and improves the leak tightness in the long term.

The shape of the slides 21 provides a means of guiding the end of the storage movement of the side elements 11. This shape firstly means that prominent shapes located in the boot such as wheel arches, the fuel filling pipe or the shock absorber support can be avoided, and secondly due to the forward thrust of the connecting rod 13 (see FIG. 3), the side elements 11 can be guided towards the front of the boot which releases space at the back of the boot, for example to place the rear lights.

What is claimed is:

1. A mobile folding rigid roof for an automobile vehicle, the roof being free to move between an extended position in which the roof covers a vehicle passenger compartment and a folded position in which the roof is stored in a boot of the vehicle, the roof comprising a roof front part and a rear part articulated to the roof front part and to a structural frame of the vehicle, the rear part comprising a rear central element whereby said rear part is articulated to the roof front part and to the structural frame, and two rear side elements that together define a housing adapted to contain the rear central element and that are installed free to move with respect to the rear central element between a use position in which the rear central element is in the housing, the roof being in said extended position, and a stored position in which the rear central element is located above the housing and below the roof front part, the roof being in said folded position, the roof comprising front drive and guidance means for displacing the rear side elements with respect to the rear central element when the roof front part is displaced with respect to the rear central element, wherein the front drive and guidance means are formed by two side connecting rods, each said connecting rod being installed free to rotate, firstly with respect to the roof front part and secondly relative to a displacement means that is designed to displace a corresponding rear side element relative to the rear central element.

2. A roof according to claim 1, wherein each said displacement means is formed of a linkage element that is mounted free to rotate firstly relative to the rear central element, and secondly to the corresponding rear side element.

3. A roof according to claim 2, wherein for each linkage element, a connecting point between the linkage element and the corresponding connecting rod is located between connecting points through which the linkage element is connected to the corresponding rear central element and rear side element.

4. A roof according to claim 1, further comprising rear drive and guidance means that are connected firstly to the rear central element, and secondly to the rear side elements.

5. A roof according to claim 4, wherein the rear drive and guidance means are formed by two side slide systems.

6. A roof according to claim 5, wherein each said slide system is formed of a stud that is fixed to the rear central element and that is installed free to slide along a slide fixed to the corresponding rear side element.

7. A roof according to claim 6, wherein each said slide extends approximately along a longitudinal direction of the vehicle when the roof is in said extended position.

8. A roof according to claim 7, wherein each said slide also extends along a vertical direction when the roof is in said extended position, so as to have a shape according to which, when the roof is in said extended position, a median part extends approximately horizontally, a front end is curved downwards and a rear end is curved upwards.

* * * * *